United States Patent [19]

Freeman et al.

[11] Patent Number: 5,158,681

[45] Date of Patent: Oct. 27, 1992

[54] DUAL MEMBRANE PROCESS FOR REMOVING ORGANIC COMPOUNDS FROM THE WATER

[75] Inventors: Scott D. N. Freeman, Minneapolis; Roy E. Larson, Edina, both of Minn.

[73] Assignee: Separation Dynamics International Ltd., Minneapolis, Minn.

[21] Appl. No.: 796,701

[22] Filed: Nov. 21, 1991

[51] Int. Cl.⁵ .............................................. C02F 1/44
[52] U.S. Cl. ..................................... 210/641; 210/652; 210/259
[58] Field of Search ............... 210/640, 650, 651, 652, 210/259, 641

[56] References Cited

U.S. PATENT DOCUMENTS 5,076,932  12/1991  Taylor ........................... 210/641 X

*Primary Examiner*—Frank Spear
*Attorney, Agent, or Firm*—Reising, Ethington, Barnard, Perry & Milton

[57] ABSTRACT

An apparatus and process for treating water contaminated with hydrocarbons utilizes a dual membrane apparatus wherein contaminated water is first treated by a cellulose based membrane to produce a permeate fraction that is clarified and has a reduced content of hydrocarbons. The clarified permeate fraction is then treated with a reverse osmosis or nanofiltration membrane to produce a purified permeate water having an additionally lowered content of hydrocarbons.

15 Claims, 2 Drawing Sheets

DUAL MEMBRANE PROCESS FOR REMOVING ORGANIC COMPOUNDS FROM THE WATER

TECHNICAL FIELD

This invention relates to an apparatus and process for removing organic compounds from the water. More particularly, the present invention relates to a method of decontaminating water containing both dispersed and dissolved hydrocarbons by means of membrane treatment.

BACKGROUND OF THE INVENTION

The U.S. Pat. No. 4,857,081 to Taylor and assigned to the assignees of the present invention, issued Aug. 15, 1989, provides a process for separating hydrocarbons and halogenated hydrocarbons from water contaminated therewith. The process utilizes hollow fibers made from regenerated cuprammonium or viscose cellulose. The hollow fibers are tubular nonporous membranes.

Industrial uses of the patented invention sometimes combine modules containing the hollow fibers with carbon beds. There is a need in the industry to reduce the organic loading on the carbon bed that is inherent with the process.

More specifically, in certain waste treatments where it is desirable to remove water from hydrocarbon contamination, soluble hydrocarbons remain in the water permeating the hollow fiber membranes being used. For example, in certain industrial runs, BTEX (benzene-toluene-ethylbenzene-xylene) and O&G (oil and grease) levels are essentially non-detectable but total organic carbon (TOC) levels have been found to be above maximum allowed levels for environmental discharge. In other cases, water soluble organic substances appear to increase the passage rate of BTEX through the cellulose hollow fiber membranes. Post-treatment of such permeates with carbon beds is often unsatisfactory as a method of reducing organic content to environmentally acceptable levels.

Hyperfiltration of contaminated waters through reverse osmosis membranes has been considered as method of treatment. However, such membranes have often proven to be very susceptible to fouling by particulates. Furthermore, contact of such membranes with water-dispersed oil, grease and aromatic hydrocarbons generally leads to rapid failure of the hyperfiltration operability because of severe fouling of membrane surfaces or damage to the membranes. Aromatic hydrocarbons, for example, are known to soften or dissolve components of reverse osmosis membrane devices.

Most reverse osmosis membranes have also been observed to permeate significant amounts of low molecular weight organic compounds contained in a contaminated feedwater. This is even more so in the case of nanofiltration membranes, which are a class of "loose" reverse osmosis membranes characterized as being more permeable to salts and organic compounds than customary reverse osmosis membranes.

It has now been found that a combination of two membrane processes, involving in sequence a first membrane treatment of a hydrocarbon contaminated feedwater with a cellulose membrane followed by hyperfiltration of permeate from the cellulose membrane by means of a reverse osmosis or nanofiltration membrane, is surprisingly effective in producing a product water having a greatly reduced content of hydrocarbons and other organic compounds.

The present invention provides a dual membrane apparatus used for processing such turbid waters contaminated with hydrocarbons so as to produce a purified water environmentally suitable for discharge, the purified water containing acceptable levels of total organic carbons.

SUMMARY OF THE INVENTION

In accordance with the present invention, there is provided a process for treating water contaminated with hydrocarbons, the process including the steps of conducting a stream of the contaminated water, imbibing a water and water soluble substance permeate through a nonporous membrane from the stream, and hyperfiltering the permeate through a reverse osmosis or nanofiltration membrane to provide a product water substantially free of water soluble organic substances.

The present invention further provides an apparatus for treating water contaminated with hydrocarbons, the apparatus including conduit means for conducting a stream of the contaminated water, nonporous membrane imbibing means for imbibing a water and water soluble substance permeate therethrough from the stream, and hyperfiltering means for providing a product water substantially free of the water soluble organic substances.

FIGURES IN THE DRAWINGS

Other advantages of the present invention will be readily appreciated as the same becomes better understood by reference to the following detailed description when considered in connection with the accompanying drawings wherein:

FIG. 1 is a schematic representation of a system constructed in accordance with the present invention FIG. 2 is a perspective view of a separation module made in accordance with the present invention; and FIG. 3 is a fragmentary view partially broken away of a hollow fiber membrane.

DETAILED DESCRIPTION OF THE INVENTION

The present invention provides a system and process for treating water contaminated with hydrocarbons. That is, the present invention is capable of completely reducing BTEX hydrocarbons to levels less than 1 to 25 milligrams per liter (25 mg/l). Further, the present invention is capable of reducing total organic carbon (TOC) levels to less than 100 mg/l. In combination with carbon post-treatment, the invention can reliably reduce BTEX hydrocarbon levels to less than 1 mg/l.

Generally, the system made in accordance with the present invention combines a separation module including nonporous membranes for imbibing a water and water soluble substance permeate therethrough from a fluid stream. A hyperfiltering module then generates a product water substantially free of the water soluble organic substances from the permeate. As discussed above, when separating hydrocarbons from water contaminated with hydrocarbons, water soluble hydrocarbons and other components can remain in the permeate. The present invention provides the second treatment means for separating the product water substantially free of the water soluble organic substances from the permeate.

Figure 1:
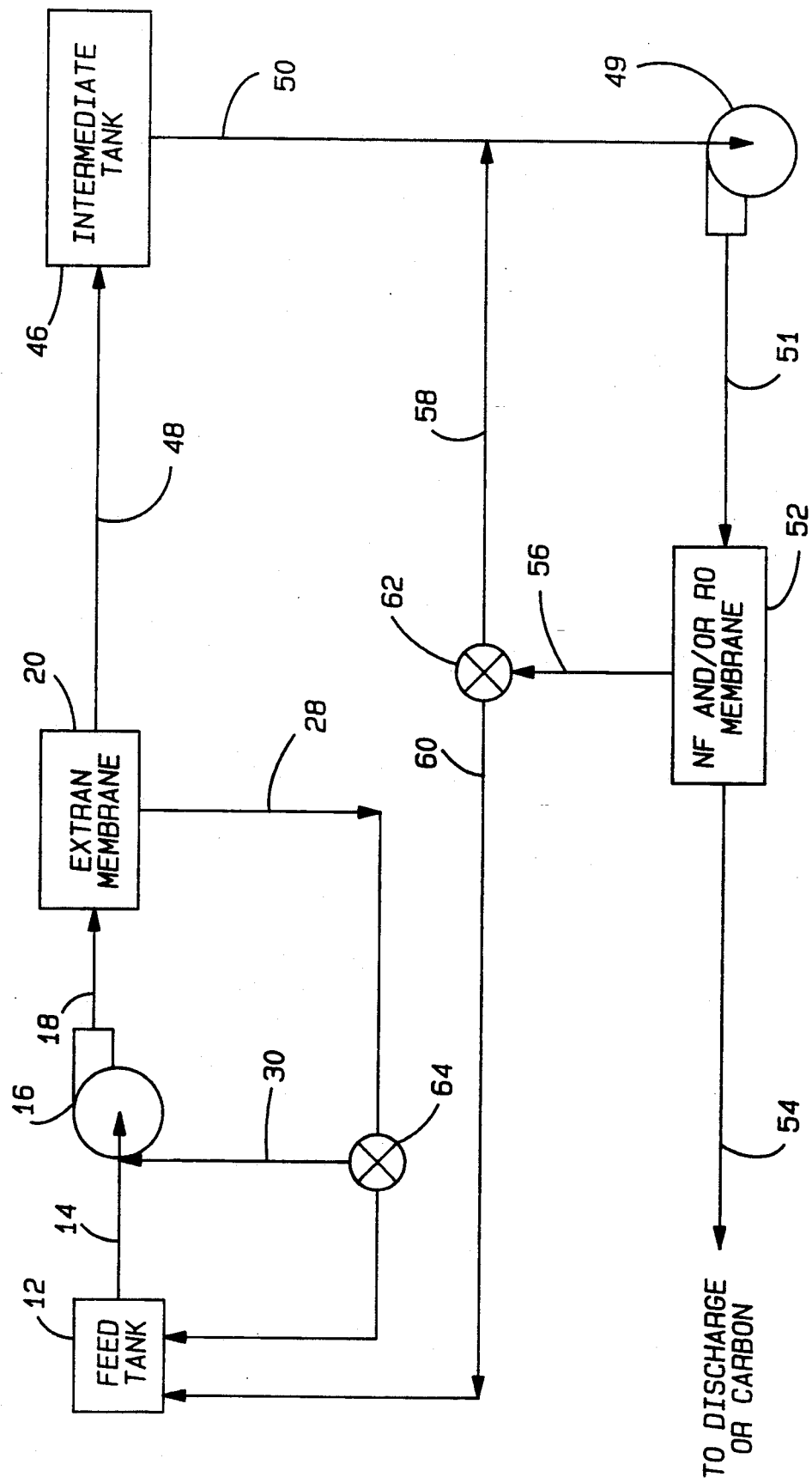
Figure 2:
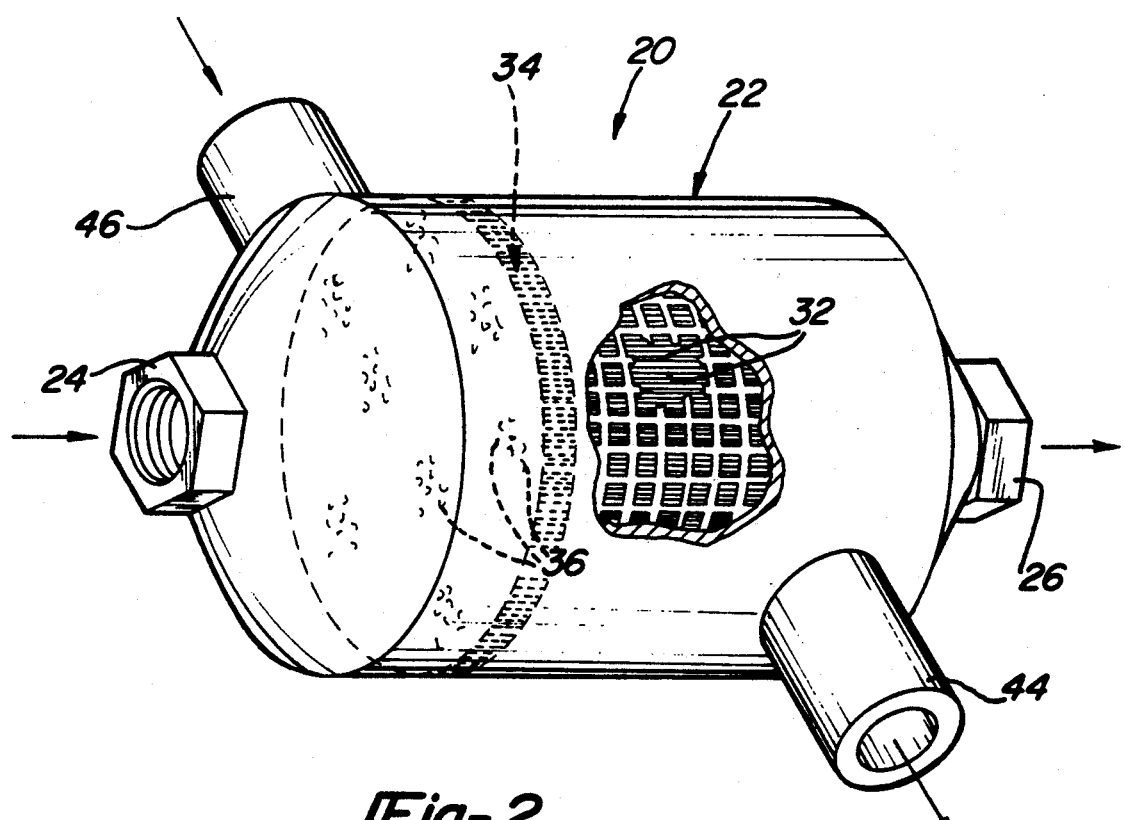

More specifically, the system is generally shown at 10 in FIG. 1. The system includes a source for the contaminated water, generally designated as a feed tank 12. The source of the water could alternatively be a contaminated water layer from a petroleum storage tank, a well water containing hydrocarbons, a collected rainwater from a petrochemical plant, or other such sources. The feed tank 12 is connected by a conduit 14 to a pump 16 for pumping the contaminated water forward through conduit 18 to a first separation module 20. An example of such a separation module is shown in FIG. 2. The module includes a housing generally shown at 22. The housing 22 includes a fluid stream inlet 24 in fluid communication with the conduit 18 for receiving a flow of contaminated water.

The housing 22 further includes a retentate outlet 26 in fluid communication with conduit 28, as shown in FIG. 1. Retentate fluid (that is, fluid which does not permeate through the membranes of the module 20) flows out of the outlet 26 into conduit 28. This retentate fluid is water flow concentrated with hydrocarbons which is carried by conduit 28 either back to the feed tank 2 or through conduit 30 to be recycled by pump 16 back through the module 20.

The housing 22 contains and supports a plurality of polyglucose hollow fibers such as regenerated cuprammonium or viscose cellulose fibers. Such hollow fibers for the use of separating hydrocarbons and halogenated hydrocarbons from a water permeate are discussed in detail in the U.S. Pat. No. 4,857,081 to Taylor, issued Aug. 15, 1989. These preferred membranes are composed of regenerated cellulose such as made from viscose or cuprammonium processes. Such fibers may also be supported membranes. In any event, these membranes are nonporous and capable of imbibing water and water soluble substances from the stream of water contaminated with hydrocarbons but incapable of imbibing and permeating dispersed material such as oil and grease globules. The membranes are capable of removing oily contamination from suspect water as well as removing particulates, including insoluble minerals and microorganisms.

The flow of contaminated feed water can be directed to either the inner or the outer surfaces of the hollow fibers, permeate being drawn off the opposite surface. For feed streams particularly contaminated with particulates, it is often advantageous to direct the feed stream through the bores of the hollow fibers, drawing permeate off the outer surface of the fibers.

The membranes discussed above are nonporous in nature and capable of permeation of water and water and soluble products while being essentially impermeable to many hydrocarbons and halogenated hydrocarbons, particularly when such are present as an emulsion or dispersed phase. The membranes do not degrade when placed in contact with contaminants such as hydrocarbons and halogenated hydrocarbons. Further, the membranes are non-fouling. Unlike prior art porous membranes having pores which can clog and thereby disrupt water flow through the membranes, this module would include a nonporous water and water soluble substance permeating membrane which imbibes water and/or water soluble substances therethrough. It is significant to note that the permeate imbibed through the membranes is devoid of particulates. This allows membrane-based separations downstream to proceed without the concomitant problem of fouling of any porous membrane surfaces by particulate matter.

The term imbibing means that unlike prior art porous membranes having pores which can clog and thereby disrupt water flow through the membranes, the present invention utilizes such permeating membranes which imbibe water and water soluble substances therethrough. The water actually dissolves in the membrane and passes through it as opposed to flowing through fixed pores in the membrane.

Figure 3:
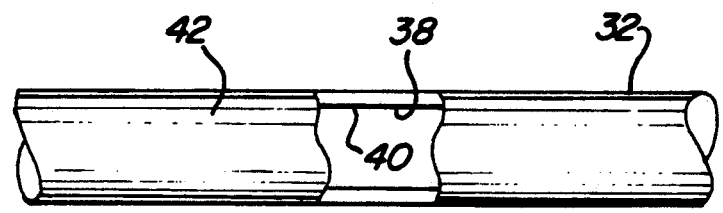

The housing 22 includes a plurality of hollow fibers 32 made in accordance with the above description supported within a resinous tube sheet 34. For example, the sheet 34 can be made from polyurethane. The fibers 32 are imbedded in a potting material 36 adjacent the inlet 24 and outlet 26. As shown in FIG. 3, each fiber 32 includes a hollow core 38 defined by an inner surface 40 of the fiber 32. Each fiber 32 also has a outer surface 42. The plurality of hollow cores 38 of the plurality of the fibers 32 define a plurality of passageways in fluid communication between the inlet 24 and outlet 26 of the housing 22. The housing 22 in combination with the outer surfaces 42 of fibers 32 define a second passageway or chamber in fluid communication with a permeate outlet 44, as shown in FIG. 2. The housing 22 may also include an inlet 46 in communication with the aforementioned outer chamber defined by the housing 22 and outer surfaces 42 of the plurality of fibers 32 for providing a sweep stream or the like.

Referring to FIG. 1, the permeate outlet 44 is in fluid communication with an intermediate storage tank 46 through conduit 49. A second pump 49 draws fluid from the intermediate tank 46 through conduit 50 and then pumps the permeate fluid through conduit 51 to a second separation module 52. The second separation module 52 may be constructed in a manner similar to the first separation module 20 detailed above. Normally, however, the second separation module will be constructed in the form of a spiral wound module. The second separation module 52 includes nanofiltration and/or reverse osmosis membranes, which provide the hyperfiltering capability. The separating layer or zone in these membranes is generally believed to be nonporous, and separation is believed to occur by a solution diffusion mechanism. However, the presence of extremely fine pores on the order of approximately ten angstroms or less cannot be excluded, particularly in the case of the nanofiltration membranes.

The nanofiltration membranes used in accordance with the present invention are substantially permeable to sodium chloride. More specifically, such membranes will generally have a sodium chloride rejection of less that 85% in contact with 0.1% aqueous sodium chloride solution at 70 to 150 psi transmembrane pressure at 25° C.

The reverse osmosis membranes used in accordance with the present invention are less permeable than nanofiltration membranes to sodium chloride. More specifically, such membranes will generally have a sodium chloride rejection of at least 85% more preferably at least 95%, in contact with 0.1% aqueous sodium chloride solution at 200 to 1000 psi transmembrane pressure at 25° C. Such membranes may be used instead of nanofiltration membranes when it is desired to produce a product water substantially free of water soluble inorganic substances as well as water soluble organic substances.

Examples of nanofiltration membranes useful in the invention include the NF-70 membrane made by Film-Tec Corporation (Minneapolis, MN) or the Desal 5 membrane made by Desalination Systems, Inc. (Escondido, CA). Such membranes are customarily available as commercial spiral-wound elements or modules. Examples of reverse osmosis membranes useful in the invention include polyamide membranes such as the TW30 membrane made by FilmTec Corporation or the B-9 hollow fiber membrane made by E. I. DuPont de Nemours & Company (Wilmington, DE). Numerous such hyperfiltration membranes and membrane suppliers exist, such that the above examples are not intended to be an exclusive representation of the type and breadth of reverse osmosis and nanofiltration membranes suitable for use in the second separation module.

The second separation module 52 is capable of hyperfiltering the water permeate so as to produce a product water substantially free of the water soluble organic substances. The flow of fluid through this membrane device is by a tangential flow process, wherein water is imbibed in and passes through the hyperfiltration membrane. Due to the trace amount of particulates in the flow (since the flow is the permeate of the nonporous cellulose membranes), fouling is minimized. The permeate flow is released from the second separation module 52 through conduit 54 to a discharge unit or carbon bed for further decontamination. A retentate flow (i.e., concentrated water soluble substances in water) can be carried from the separation module 52 by conduit 56 for recycling through conduit 58 or to return to the feed tank 12 through conduit 60. The system 10 would include a valving means 62 to control such flow. Likewise, the system would include a similar valving means 64 to control the cycle of return flow through conduit 28 from the first separation module 20.

It should be noted that both separation modules operate by utilizing tangential flow separation. Such separation flow in general is well known in the art. Briefly, the flow including the materials to be separated flows through the hollow cores 38 of the membranes and tangentially contacts the inner surfaces 40 of the membranes. The membranes in both separation modules 20 and 52 are capable of extracting water from the fluid flow. While extracting the water, the first separation module is capable of also drawing some water soluble substances, both organic and inorganic, with the water. The second separation module is capable of significantly reducing those trace amounts of total organic carbons so as to provide environmentally acceptable water discharge to either a discharge unit or a carbon bed. Depending upon choice of hyperfiltration membrane type, the second separation module is also capable of significantly reducing the content of inorganic water soluble substances.

The present invention further provides a process for treating turbid water containing hydrocarbons. Generally, the process includes the steps of conducting a stream of contaminated water, imbibing a water and water soluble substance permeate through the nonporous membrane from the stream and hyperfiltering the water free of the water soluble substances from the permeate.

More specifically, and as discussed above in detail, the process includes the steps of conducting the stream to one surface 40, 42 of the plurality of nonporous cellulosic hollow fiber membranes 32, each membrane having an inner and outer surface 40, 42. The permeate is imbibed through the membrane's 32 and removed from the other of the membrane surfaces. That is, the inventive process could run the contaminated water flow through inlet 24 and across the inner surfaces 40 of the membranes 32. The retentate would be released though the outlet 26 while the permeate would be released through outlet 44, possibly by a sweep stream entering inlet 46. Alternatively, the contaminated waters could enter the inlet 46 and contact the outer surfaces of the membranes 32. The retentate would exit through outlet 44. The permeate would be imbibed through the membranes 32 and be released through the inner surface 40 of the membranes and then exit from the housing 2 through outlet 26. A sweep stream could enter the housing 22 through inlet 24 and thereby pass through the hollow cores 38 of the membranes 32.

The following examples illustrate the ability of the present invention to separate hydrocarbon contaminants from contaminated water.

In an initial test, 10 gallons of raw feed water from a petroleum fuel storage tank site was run through a system made in accordance with the present invention as detailed above. The contaminated water was processed with a EXTRAN TM S-4 module (product of Separation Dynamics International, Inc.), the module containing a plurality of nonporous hollow fiber cuprammonium regenerated cellulose fibers. The resulting permeate was used as the feed stock for a FILMTEC® NF70-2514 spiral wound element (manufactured by FilmTec Corporation), which was mounted within a pressure vessel and operated in a closed loop manner. Flow data and product water samples were collected at both 60 psi and 90 psi conditions. The NF-70 module was operated as a concentrator to simulate concentration increases in the system. The NF-70 permeate (product water) was removed from the system until the feed had been concentrated by a factor of two (designated 2× in the data below). The NF-70 permeate was again collected and referred to below as NF-70 PERM-90 psi (with the 2×feed). Then the NF-70 feed stock was added to the EXTRAN TM systems feed where it was run through that system again to simulate return of concentrated material back to the original feed tank. As shown in Table I below, the TOC concentrations were greatly reduced from the EXTRAN TM feed stream. The combination of NF-70 hyperfiltration with the Extran TM treatment provided a product water with a 4 to 5-fold reduction in TOC content.

TABLE I

| SAMPLE | TOC (mg/l) |
|---|---|
| EXTRAN FEED | 620 |
| EXTRAN PERMEATE | 590 |
| NF-70 PERM-60 PSI | 120 |
| NF-70 PERM-90 PSI | 83 |
| NF-70 PERM-90 PSI (WITH 2 × FEED) | 130 |
| RESULTING 2 × EXTRAN FEED | 860 |
| 2 × EXTRAN PERM | 760 |

The above experiment was rerun utilizing Sorbtech (S) or Darco (D) carbon beds. This experiment further utilized a reverse osmosis membrane (FILMTEC® TW30-2514 module). These tests were run exactly as the test described above providing significant reduction in trace levels of TOC, as shown in Table II.

TABLE II

| SAMPLE | TOC (mg/l) |
|---|---|
| NF-70 PERM | 31 |
| NF-70 + S | 5.3 |

TABLE II-continued

| SAMPLE | TOC (mg/l) |
| --- | --- |
| NF-70 + S + D | 4.5 |
| NF-70 + D | 3.4 |
| TW-30 | 12 |
| TW-30 + S + D | 3.6 |
| EXTRAN FEED | 950 |

A third experiment utilized 6 inch diameter EXTRAN membrane and NF-70-8040 nanofiltration membrane modules in combination with Sorbtec (S) carbon. The experiment was repeated four times with the results being shown in Table III.

TABLE III

| TOC (mg/l): | 1 | 2 | 3 | 4 |
| --- | --- | --- | --- | --- |
| EXTRAN FEED | 238 | 268 | 330 | 245 |
| EXTRAN PERMEATE | 118 | 251 | 327 | 232 |
| NF-70 PERM | 54.5 | 53.6 | 37.2 | 27.6 |
| NF-70 CONC. | 558 | 665 | — | — |
| POST CARBON 1 | 33.7 | 48.2 | — | — |
| POST CARBON 2 | 18.7 | 34.5 | 10.1 | 2.8 |

In these experiments, the TOC levels were reduced to environmentally acceptable levels prior to carbon treatment. Accordingly the present invention can be utilized with or without carbon beds in order to produce environmentally acceptable discharge water.

The invention has been described in an illustrative manner, and it is to be understood that the terminology which has been used is intended to be in the nature of words of description rather than of limitation.

Obviously many modifications and variations of the present invention are possible in light of the above teachings. It is, therefore, to be understood that within the scope of the appended claims the invention may be practiced otherwise than as specifically described.

What is claimed is:

1. A method for treating water contaminated with hydrocarbon, said process including the steps of:
   conducting a stream of the contaminated water;
   imbibing a water and water soluble substance permeate through a nonporous membrane from the stream; and
   hyperfiltering the permeate to produce water substantially free of the water soluble substance.

2. A method as set forth in claim 1 wherein said conducting step is further defined as conducting the stream to one surface of a plurality of nonporous cellulosic hollow fiber membranes, each of the membranes having inner and outer surfaces, said imbibing step being further defined as imbibing the permeate through the membranes and removing the permeate from the other of the surfaces of the membranes.

3. A method as set forth in claim 2 wherein the membranes are cuprammonium cellulose membranes.

4. A method as set forth in claim 1 or 2 wherein said hyperfiltering step is further defined as passing the permeate through a nanofiltration or reverse osmosis membrane and having a purified product water and a contaminated concentrate retentate.

5. A method as set forth in claim 4 wherein the nanofiltration or reverse osmosis membrane has a separating layer comprising a polyamide.

6. A method as set forth in claim 4 wherein the reverse osmosis membrane has a sodium chloride rejection of at least 85 percent in contact with 0.1% aqueous sodium chloride solution at 200 to 1000 psi transmembrane pressure at 25° C.

7. A method as set forth in claim 4 wherein the nanofiltration membrane has a sodium chloride rejection of less than 85 percent in contact with 0.1% aqueous sodium chloride solution at 70 to 150 psi transmembrane pressure at 25° C.

8. A method as set forth in claim 1 further including the step of passing the water substantially free of water soluble substance through activated carbon.

9. A method as set forth in claim 1 wherein said hyperfiltering step is further defined as reducing the total organic carbon content of the water to less than 100 milligrams per liter.

10. An apparatus for treating water contaminated with hydrocarbons said apparatus comprising:
    conduit means for conducting a stream of the contaminated water;
    nonporous membrane imbibing means for imbibing a water and water soluble substance permeate therethrough from the stream; and
    hyperfiltering means for producing a product water substantially free of the water soluble substances from the permeate.

11. An apparatus as set forth in claim 10 further including a carbon separator module in fluid communication with said hyperfiltering means for further removing hydrocarbon from the contaminated water.

12. An apparatus for treating water contaminated with hydrocarbons, said apparatus comprising:
    conduit means for conducting a stream of the contaminated water;
    a first separator module in fluid communication with said conduit means, said module including a plurality of nonporous hollow core regenerated cellulose fibers for imbibing a water and water soluble substance permeate stream therethrough from the stream; and
    a second separator module in fluid communication with the permeate stream and including nanofiltration or reverse osmosis membranes for hyperfiltering the permeate stream and producing a product water substantially free of the water soluble substances.

13. An apparatus as set forth in claim 12 wherein the nanofiltration or reverse osmosis membrane has a separating layer comprising a polyamide.

14. An apparatus as set forth in claim 13 wherein the reverse osmosis membrane has a sodium chloride rejection of at least 85 percent in contact with 0.1% aqueous sodium chloride solution at 200 to 1000 psi transmembrane pressure at 25° C.

15. An apparatus as set forth in claim 13 wherein the nanofiltration membrane has a sodium chloride rejection of less than 85 percent in contact with 0.1% aqueous sodium chloride solution at 70 to 150 psi transmembrane pressure at 25° C.

* * * * *